US011323986B2

(12) United States Patent
Chiu et al.

(10) Patent No.: US 11,323,986 B2
(45) Date of Patent: May 3, 2022

(54) METHOD OF PROCESSING A RECEIVED CHANNEL SIGNAL IN A DEVICE TO DEVICE COMMUNICATIONS LINK USING MULTIPLE REFERENCE SIGNALS

(71) Applicant: Hong Kong Applied Science And Technology Research Institute Co., Ltd., Shatin (HK)

(72) Inventors: Eddy Chiu, Kowloon (HK); Yun Hou, Tai Po (HK); Yuyi Mao, Tai Wai (HK); Xiangyu Liu, Guangdong (CN); Ching Hong Chris Leung, Tia Po (HK); Man Wai Victor Kwan, Shatin (HK); Kong Chau Eric Tsang, Kowloon (HK)

(73) Assignee: Hong Kong Applied Science and Technology Research Institue Company Limited, Shatin (HK)

( * ) Notice: Subject to any disclaimer, the term of this patent is extended or adjusted under 35 U.S.C. 154(b) by 147 days.

(21) Appl. No.: 16/815,144

(22) Filed: Mar. 11, 2020

(65) Prior Publication Data
US 2021/0289486 A1    Sep. 16, 2021

(51) Int. Cl.
*H04W 72/04*    (2009.01)
*H04W 56/00*    (2009.01)
*H04W 4/40*     (2018.01)

(52) U.S. Cl.
CPC ......... *H04W 72/0406* (2013.01); *H04W 4/40* (2018.02); *H04W 56/005* (2013.01); *H04W 72/044* (2013.01)

(58) Field of Classification Search
CPC ................................................ H04W 72/0406
See application file for complete search history.

(56) References Cited

U.S. PATENT DOCUMENTS 9,001,812 B2    4/2015  Yu et al.
10,165,562 B2  12/2018  Wang et al.
(Continued)

FOREIGN PATENT DOCUMENTS

CN    2017193972 A1    11/2017
CN    110741581 A       1/2020

OTHER PUBLICATIONS

Fuijtsu; Remaining issues on physical layer structure for sidelink;3GPP TSG RAN WG1 #100 R1-2000545; Mar. 6, 2020.

*Primary Examiner* — Edan Orgad
*Assistant Examiner* — Won Tae C Kim

(57) ABSTRACT

Described is a method of decoding a physical sidelink control channel (PSCCH). The method comprises: for a PSCCH candidate in a resource grid, processing a received demodulation reference signal (DMRS) in a subframe of the resource grid associated with the PSCCH candidate to determine one or more potential PSCCHs for decoding, each of the one or more potential PSCCHs being identified by resource block (RB) position in the resource grid and a corresponding DMRS cyclic shift ($n_{cs}$) value. This step is repeated for at least one other DMRS in the subframe to determine one or more potential PSCCHs for the at least one other DMRS. Then, a subset L of PSCCHs is selected from the potential PSCCHs. The selected subset L of PSCCHs together with their corresponding DMRS cyclic shift ($n_{cs}$) values are made available for use in a decoding process for the received channel signal.

14 Claims, 11 Drawing Sheets

(56) References Cited

U.S. PATENT DOCUMENTS

| | | | |
|---|---|---|---|
| 2018/0332491 A1 | 11/2018 | Eckardt et al. | |
| 2019/0200370 A1 | 6/2019 | Yang et al. | |
| 2020/0029340 A1* | 1/2020 | He | H04B 7/2615 |
| 2020/0299340 A1 | 9/2020 | Brown et al. | |
| 2021/0076433 A1* | 3/2021 | Hou | H04W 56/002 |
| 2021/0377893 A1* | 12/2021 | Khoryaev | H04W 56/002 |
| 2022/0015035 A1* | 1/2022 | Choi | H04W 72/04 |

* cited by examiner

METHOD OF PROCESSING A RECEIVED CHANNEL SIGNAL IN A DEVICE TO DEVICE COMMUNICATIONS LINK USING MULTIPLE REFERENCE SIGNALS

FIELD OF THE INVENTION

The invention relates generally to device to device wireless communication and, more specifically, but not exclusively, to decoding signals of channels such as a physical sidelink shared channel (PSSCH) and a physical sidelink control channel (PSCCH) using multiple PSCCH (DMRS) symbols for timing offset (TO) estimation and compensation, and DMRS identification and checking. The invention has particular applicability to a sidelink in a vehicle to everything (V2X) communication system.

BACKGROUND OF THE INVENTION

Sidelink is a 3$^{rd}$ Generation Partnership Project (3GPP) Long-Term-Evolution (LTE) feature first introduced in 3GPP Release 12 aimed at enabling device to device (D2D) communications within legacy cellular-based LTE radio access networks. Sidelink has been enriched in 3GPP Release 14 with various features. D2D is applicable to public safety and commercial communication use-cases, and recently, in 3GPP Release 14, to V2X scenarios.

Intelligent transport systems provide a framework for road users and traffic managers to share information where V2X defines the exchange of information between vehicles and other types of stations/devices, such as roadside units, infrastructure, pedestrians or other vehicles. In the V2X physical access layer, LTE-V2X uses the sidelink channel which is designed based on the LTE uplink waveform. Two sidelink modes dedicated to V2X were introduced in 3GPP Release 14: modes 3 and 4 support direct vehicular communications but differ on how stations' resources are allocated. In mode 3, vehicles are within the coverage of the cellular network, and the stations' resources are selected, allocated and reserved by the eNodeB. In contrast, mode 4 is designed to work without the requirement of being under coverage of the cellular network: resources are autonomously selected by the stations/devices without requiring the involvement of the eNodeB even if present.

The sidelink waveform design is similar to the earlier developed LTE uplink, re-using the same principles for the subframe organization. LTE-V2X is a synchronous network, where all the users have the same coarsely synchronized time reference, typically obtained from a global navigation satellite system (GNSS). Time is divided into subframes. Each LTE subframe has a length of 1 ms and contains 14 OFDM symbols. One LTE-V2X subframe comprises 4 DMRS symbols and 9 data symbols conveying the user's payload. The last symbol is not transmitted, and acts as a time guard to allow transmitters to return to receiver state before the next subframe. The first data symbol may not be available for use by the receiver as it might be used for automatic gain control (AGC) calibration purposes.

Frequency-wise, the LTE-V2X channel bandwidth is divided into a given number of subchannels. Each subchannel comprises a number of resource blocks (RBs) having 12 subcarriers. Two main physical channels are used in LTE-V2X: the PSSCHs which are used to transmit data packets, known as transport blocks (TB), and the physical sidelink control channels (PSCCHs) which are used to transmit the associated control messages, known as sidelink control information (SCI). The PSCCH SCI and its associated PSSCH TB may be transmitted in the same subframe or different subframes.

PSCCH always occupies two RBs. Each of the DMRSs of a PSCCH carries a 24-sample complex valued sequence with a cyclic shift ($n_{cs}$) parameter defining how 'fast' a DMRS sequence rotates in the complex plane. PSCCH DMRSs are constant modulus symbols derived from a Zadeoff-Chu sequence in conjunction with a cyclic shift ($n_{cs}$). The cyclic shift ($n_{cs}$) value is randomly selected by the transmitter such that the receiver does not know which cyclic shift ($n_{cs}$) value has been selected. DMRSs with different cyclic shift ($n_{cs}$) values are mutually orthogonal. In V2X, the cyclic shift ($n_{cs}$) values can be 0, 3, 6 or 9. Any offset in timing of received PSCCHs violates the orthogonality condition.

For PSSCH, the number of occupied RBs depends on the user's payload size, on the subchannels division, and on the modulation and coding scheme (MCS) used.

A user equipment (UE), which can be both a transmitter and a receiver, may transmit a data packet comprising PSSCH which carries message payload; PSCCH which carries control information; and DMRSs which are the pre-defined sequences known to all receiving UEs or other receiving devices. A UE in a V2X system, such as a vehicular UE (VUE), is always receiving if not transmitting and does not know which other devices are transmitting or where data packets are located. Currently, to receive data, the receiving UE needs to blindly search in the PSCCH resource grid search space and then decode the corresponding PSSCH to obtain the data. The entire search space may need to be searched. The PSCCH detecting efficiency is therefore low. In some applications such as, for example, a V2X system, the receiving UE is required to accurately decode a certain or defined number of PSSCH payloads as soon as possible for obtaining critical messages.

In V2X, a VUE is typically required to detect PSCCHs from up to 10 transmitting VUEs in each subframe without prior information as to how many PSCCHs there are and the used radio resources of the received PSCCHs and to decode the associated PSSCH payloads as quickly as possible. As each PSCCH spans 2 RBs, comprising a consecutive RB pair, in the resource grid and there are at most M possible RB candidate pairs where M=46 for a 10 MHz bandwidth and M=96 for a 20 MHz bandwidth, in a worst case scenario a VUE may have to blindly search and detect X.M PSCCHs where X is the number of possible cyclic shift ($n_{cs}$) options for each PSCCH DMRS. In the case of V2X, X=4. This blind processing is computationally very expensive and time consuming and is thus undesirable in at least the V2X environment.

U.S. Pat. No. 9,001,812 discloses a timing offset/error estimate (TOE) method, e.g., for an LTE uplink (UL) receiver by using the equation:

$$\tilde{\tau}_L = \frac{N}{2\pi L}(\angle P'_{k-L} - \angle P'_k)$$

where L is the subcarrier separation. TO estimation quality is improved by taking an average of $\tilde{\tau}_L$ using different values of L.

US2018/0332491 discloses a method to detect a sidelink identification by performing a series of correlations using the DMRS and a set of demodulation reference templates stored in the memory component of a UE.

WO2017/193972 (also published as US2019/0200370) discloses a method for determining priority of a resource comprising: processing a PSCCH by means of performing energy detection to obtain a detected result, and performing information decoding to obtain a decoded result; and weighting at least one of the detected result and the decoded result to determine the priority of a PSCCH resource.

U.S. Ser. No. 10/165,562 discloses a blind detection method and system for a physical downlink control channel (PDCCH). The method involves obtaining PDCCH data. The PDCCH data is used according to location identifier of resource element for a packet. A soft bit data of a control channel unit is obtained according to the PDCCH data. DCI data is confirmed according to the soft bit data of the CCE. A random-access wireless network temporary identifier is obtained according to the DCI data. The PDCCH blind detection is performed based on the random-access wireless network temporary identifier.

What is desired is a method of progressively pre-screening PSCCHs along multiple received DMRSs in order to accelerate the PSCCH detection process, reduce unnecessary processing and power consumption, improve PSCCH detection efficiency and ensure high detection accuracy.

OBJECTS OF THE INVENTION

An object of the invention is to mitigate or obviate to some degree one or more problems associated with methods of pre-screening PSCCHs along multiple received DMRSs to detect the corresponding PSCCHs to then decode the received channel signal to obtain the PSSCH data.

The above object is met by the combination of features of the main claims; the sub-claims disclose further advantageous embodiments of the invention.

Another object of the invention is to progressively pre-screen PSCCHs along multiple received DMRSs, but without processing of all said multiple received DMRSs in order to accelerate the PSCCH detection process.

Another object of the invention is to pre-screen PSCCHs and only detect the most likely PSCCH candidates using the most likely DMRS cyclic shift ($n_{cs}$) values.

One skilled in the art will derive from the following description other objects of the invention. Therefore, the foregoing statements of object are not exhaustive and serve merely to illustrate some of the many objects of the present invention.

SUMMARY OF THE INVENTION

The invention concerns a method of progressively pre-screening PSCCHs along multiple received DMRSs, but without necessarily requiring processing of all said multiple received DMRSs. The method involves decoding a PSCCH where, for a PSCCH candidate in a resource grid, the method comprises the step of processing a received DMRS in a subframe of said resource grid associated with said PSCCH candidate to determine one or more potential PSCCHs for decoding, each of said one or more potential PSCCHs being identified by resource block (RB) position in the resource grid and a corresponding DMRS cyclic shift ($n_{cs}$) value. This step is repeated for at least one other DMRS in said subframe to determine one or more potential PSCCHs for said at least one other DMRS. Then, a subset L of PSCCHs is selected from said potential PSCCHs whereby said selected subset L of PSCCHs together with their corresponding DMRS cyclic shift ($n_{cs}$) values are made available for use in a decoding process for the received channel signal.

The method may include, as a preliminary process, PSCCH resource grid search space reduction comprising identifying PSCCH candidates having a signal power below a first threshold such that a pair of RBs comprising said PSCCH candidate can be excluded from further processing. Search space reduction may additionally or alternatively include identifying PSCCH candidates comprising RB pairs where a difference in signal power between the RBs comprising each pair of RBs is above a second threshold and excluding any such said RB pairs from further processing.

Timing offset (TO) compensation may include circularly correlating TO-compensated received DMRSs and their corresponding local DMRSs to obtain energy, power, or correlation profiles.

From the energy/power/correlation profiles, a subset L of validated potential PSCCHs having highest energy/power/correlation values may be selected and provided with their corresponding DMRS cyclic shift ($n_{cs}$) values for use in a decoding process for a received channel signal.

In a first main aspect, the invention provides a method of processing a received channel signal, the method comprising: (a) for a physical sidelink control channel (PSCCH) candidate in a resource grid, processing a received demodulation reference signal (DMRS) in a subframe of said resource grid associated with said PSCCH candidate to determine one or more potential PSCCHs for decoding, each of said one or more potential PSCCHs being identified by resource block (RB) position in the resource grid and a corresponding DMRS cyclic shift value ($n_{cs}$); (b) repeating step (a) for at least one other DMRS in said subframe to determine one or more potential PSCCHs for said at least one other DMRS; (c) selecting a subset L of PSCCHs from said potential PSCCHs determined by steps (a) and (b); and (d) making said selected subset L of PSCCHs with their corresponding DMRS cyclic shift ($n_{cs}$) values available for use in a decoding process for the received channel signal.

In a second main aspect, the invention provides a device for processing a received channel signal, the device comprising: a receiver configured to receive channel signals, wherein the channel signals include control channel data blocks of a control channel; and a signal detection module configured for detecting control channel blocks of the control channel, wherein the signal detection module includes machine readable instructions stored in a memory and executable by a processor to perform the steps of the first main aspect of the invention.

In a third main aspect, the invention provides a user equipment (UE) for processing a received channel signal, the UE comprising: a receiver configured to receive channel signals, wherein the channel signals include control channel data blocks of a control channel; and a signal detection module configured for detecting control channel blocks of the control channel, wherein the signal detection module includes machine readable instructions stored in a memory and which are executable by a processor to perform to perform the steps of the first main aspect of the invention.

Another aspect of the invention provides a method of processing a received channel signal, the method comprising performing one or both of the following sets of steps (a) and (b): where the set of steps (a) comprises: (i) determining a signal power for a resource block (RB) in a resource grid; (ii) comparing the determined signal power for said RB with a selected, calculated or predetermined first threshold ($Th_0$); (iii) identifying RBs in the resource grid having a determined signal power less than the first threshold ($Th_0$) and excluding any such RBs from further processing; and where the set of steps (b) comprises: (i) selecting candidate pairs of RBs in the resource grid; (ii) determining a signal power for each RB in each candidate RB pair in the resource grid; (iii) for each candidate RB pair in the resource grid, determining a difference in signal power between the RBs comprising the pair of RBs; (iv) comparing the determined difference in signal power between the RBs comprising the pair of RBs with a selected, calculated or predetermined second threshold ($Th_1$); (v) identifying any candidate RB pair where the determined difference in signal power between the RBs comprising the pair of RBs is greater than the second threshold ($Th_1$) and excluding any such candidate RB pair from further processing.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
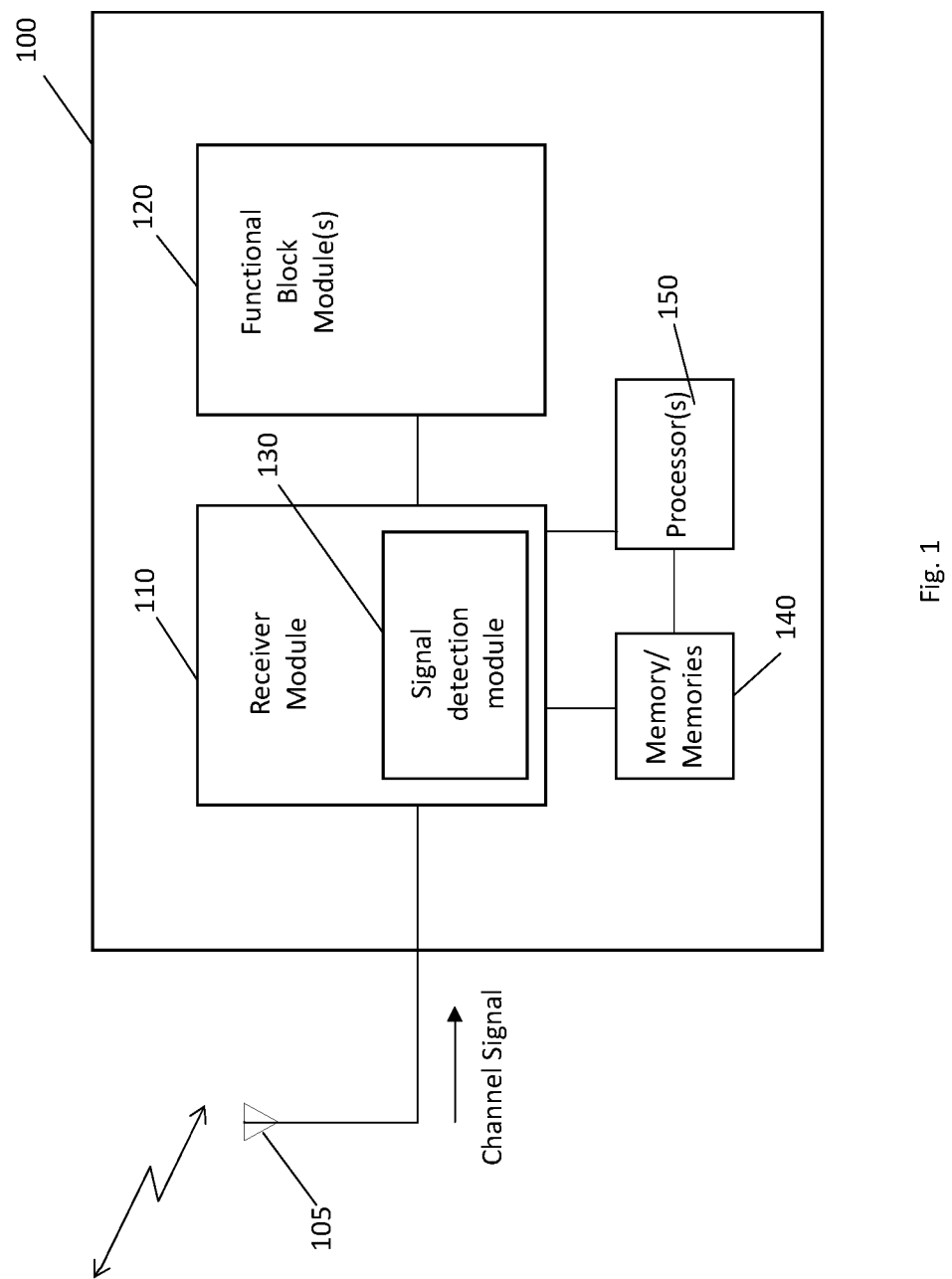
FIG. 1 is a block schematic diagram of a channel signal processing device in accordance with the present invention.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS, may be implemented in various forms of hardware, software or combinations thereof. These elements may be implemented in a combination of hardware and software on one or more appropriately programmed general-purpose devices, which may include a processor, memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

The invention relates to device to device wireless communication. The method may include a method for PSCCH search space reduction comprising prescreening the PSCCH search space for PSCCH candidates using energy detection, but is particularly concerned with timing offset (TO) estimation/compensation of received channel signals, identifying DMRSs and choosing PSCCH candidates based on the DMRS identification results for decoding the received channel signals. The invention has particular applicability to a vehicle to everything (V2X) communication system.

FIG. 1 shows an exemplary embodiment of a channel signal processing device 100 in accordance with concepts of the present invention. In the illustrated embodiment, processing device 100 comprises communication equipment such as a handset device, a UE, a network node, a V2X unit (e.g. a vehicular UE (VUE) or a roadside unit), etc. operating in a V2X environment such as, but not limited to a wireless network, e.g. a wireless cellular network. The wireless cellular network may comprise a 4G cellular network. It will be appreciated, however, that the concepts of the invention are not limited to use in a V2X environment. It will also be appreciated that the concepts of the invention do not require the presence or operation of an eNodeB in the communications network.

The processing device 100 may comprise a plurality of functional blocks for performing various functions thereof. For example, the processing device 100 includes receiver module 110 providing received signal processing and configured to provide received signals and/or information extracted therefrom to functional block module(s) 120 such as may comprise various data sink, control element(s), user interface(s), etc. Although receiver module 110 is described as providing received signal processing, it will be appreciated that this functional block may be implemented as a transceiver providing both transmitted and received signal processing. Irrespective of the particular configuration of receiver 110, embodiments include signal detection module 130 disposed in association with the receiver module 110 for facilitating accurate processing and/or decoding of a received channel signal in accordance with the invention. Channel signals may be received via an antenna module 105. Furthermore, the receiver module 110 is configured to process and/or decode a received channel signal when transmitting station identifier information is not known or, more particularly, is not provided as is typically the case in a sidelink of a V2X system.

Although the signal detection module 130 is shown as being deployed as part of the receiver module 110 (e.g. comprising a portion of the receiver module control and logic circuits), there is no limitation to such a deployment configuration according to the concepts of the invention. For example, the signal detection module 130 may be deployed as a functional block of processing device 100 that is distinct from, but connected to, receiver module 110. The signal detection module 130 may, for example, be implemented using logic circuits and/or executable code/machine readable instructions stored in a memory 140 of the processing device 100 for execution by a processor 150 to thereby perform functions as described herein. For example, the executable code/machine readable instructions may be stored in one or more memories 140 (e.g. random access memory (RAM), read only memory (ROM), flash memory, magnetic memory, optical memory or the like) suitable for storing one or more instruction sets (e.g. application software, firmware, operating system, applets, and/or the like), data (e.g. configuration parameters, operating parameters and/or thresholds, collected data, processed data, and/or the like), etc. The one or more memories 140 may comprise processor-readable memories for use with respect to one or more processors 150 operable to execute code segments of signal detection module 130 and/or utilize data provided thereby to perform functions of the signal detection module 130 as described herein. Additionally, or alternatively, the signal detection module 130 may comprise one or more special purpose processors (e.g. application specific integrated circuit (ASIC), field programmable gate array (FPGA), graphics processing unit (GPU), and/or the like configured to perform functions of the signal detection module 130 as described herein.

As described in greater detail below, the signal detection module 130 is configured to implement PSCCH resource grid search space reduction, timing offset estimation and compensation of received channel signals, and DMRS symbol identification.

Whilst the following description makes reference to a LTE-V2X network by way of example, it will be understood that the concepts of the invention are applicable to New Radio (NR), i.e. 5G, networks and particularly, although not exclusively, to the LTE-V2X evolutions of 3GPP Release 15 to support, for example, 5G-V2X communications and autonomous vehicles' applications.

LTE-V2X channel bandwidth is divided into a given number of subchannels. Each subchannel has a number of resource blocks (RBs) having 12 subcarriers. The two main physical channels used in LTE-V2X comprise the PSSCHs which are used to transmit data packets in transport blocks (TB) and the PSCCHs which are used to transmit the associated sidelink control information (SCI). The PSCCH SCI and its associated PSSCH TB may be transmitted in the same subframe or different subframes.

PSCCH always occupies two RBs. The DMRSs of a PSCCH carry a 24-sample complex valued sequence with a cyclic shift ($n_{cs}$) parameter defining how 'fast' a DMRS sequence rotates in the complex plane. The cyclic shift ($n_{cs}$) value is randomly selected by the transmitter such that the receiver does not know which cyclic shift ($n_{cs}$) value has been selected. DMRSs with different cyclic shift ($n_{cs}$) values being mutually orthogonal. In V2X, there are four possible cyclic shift ($n_{cs}$) values, i.e. $n_{cs}$=0, 3, 6 or 9.

In V2X, a VUE is typically required to detect PSCCHs from up to 10 transmitting VUEs in each subframe without prior information as to how many PSCCHs there are and the used radio resources of the received PSCCHs and to decode the associated PSSCH payloads as quickly as possible. Each PSCCH spans 2 RBs, comprising a consecutive RB pair, in the resource grid and there are at most M possible RB candidate pairs where M=46 for a 10 MHz bandwidth and M=96 for a 20 MHz bandwidth. In a worst-case scenario, a VUE may have to blindly search and detect 4M PSCCHs as there are four possible cyclic shift ($n_{cs}$) options for each PSCCH DMRS.

Figure 2:
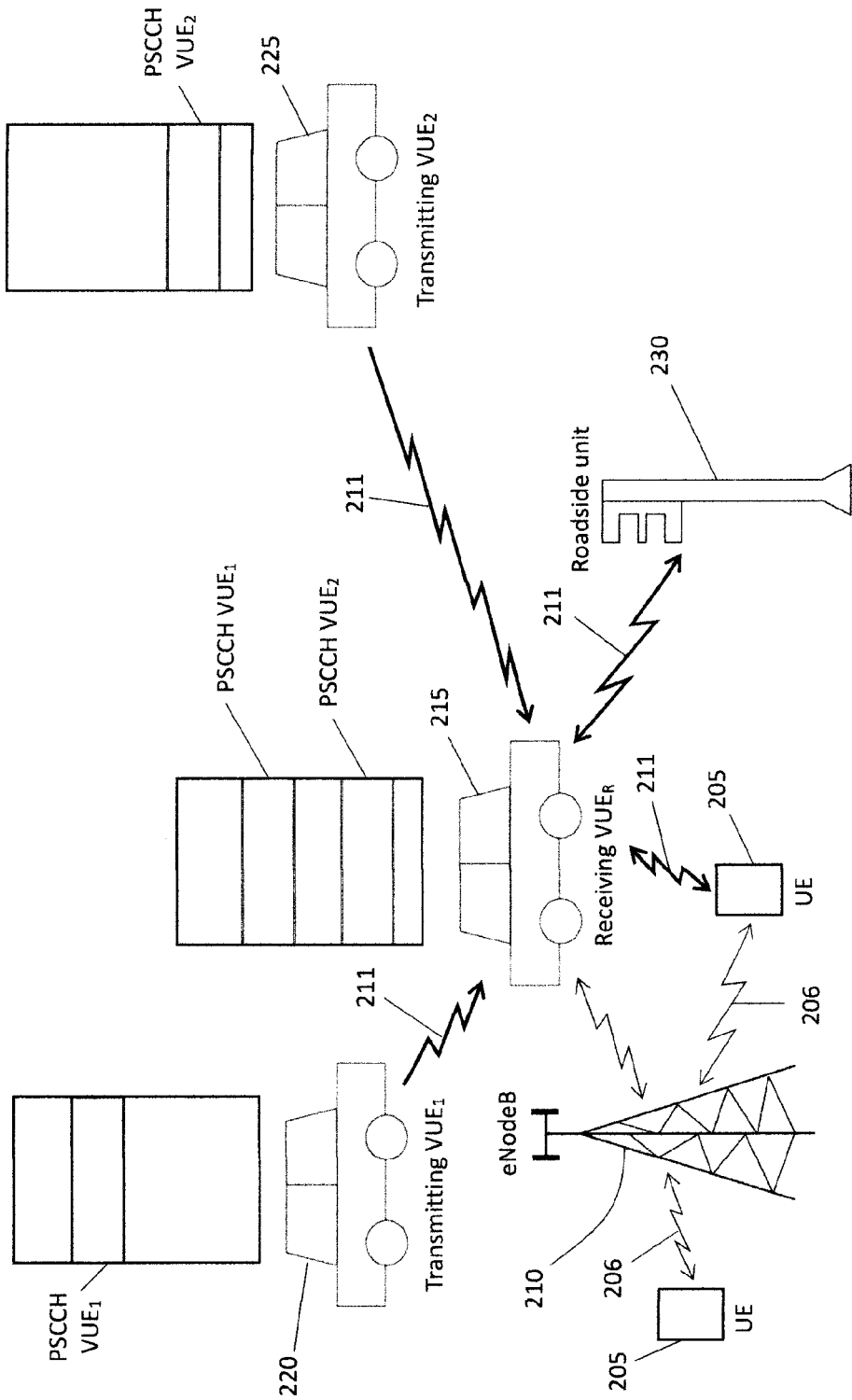
FIG. 2 is an illustration of an LTE-V2X network in which the concepts of the present invention can be implemented.

Referring to FIG. 2, in a legacy uplink/downlink LTE network scenario, two UEs 205 normally communicate through wireless links 206 using the LTE "Uu" interface and data are always traversing the LTE eNodeB 210. In contrast, a sidelink 211 enables direct communication between proximal UEs including VUEs (VUE$_R$, VUE$_1$, VUE$_2$) 215, 220, 225 using the "PC5" interface, and data does not need to go through the eNodeB 210. It will be understood that in the V2X network of FIG. 2, all of the devices including UEs 205, VUEs 215, 220, 225 and roadside unit(s) 230 may communicate via sidelinks 211 thereby negating the involvement of the eNodeB 210.

In the example of FIG. 2, which is provided merely by way of illustration, VUE$_R$ 215 receives channel signals (PSSCH/PSCCH) from at least VUE$_1$ 220 and VUE$_2$ 225. As illustrated, VUE$_1$ 220 is located closer to VUE$_R$ 215 than VUE$_2$ 225 such that the signal strength of VUE$_1$ 220 at VUE$_R$ 215 is greater than the signal strength of VUE$_2$ 225 at VUE$_R$ 215. This can be better understood by reference to FIG. 4 where it can be seen that the signal powers of the RBs for VUE$_1$ 220 at VUE$_R$ 215 are stronger than the signal powers of the RBs for VUE$_2$ 225 at VUE$_R$ 215.

Figure 3:
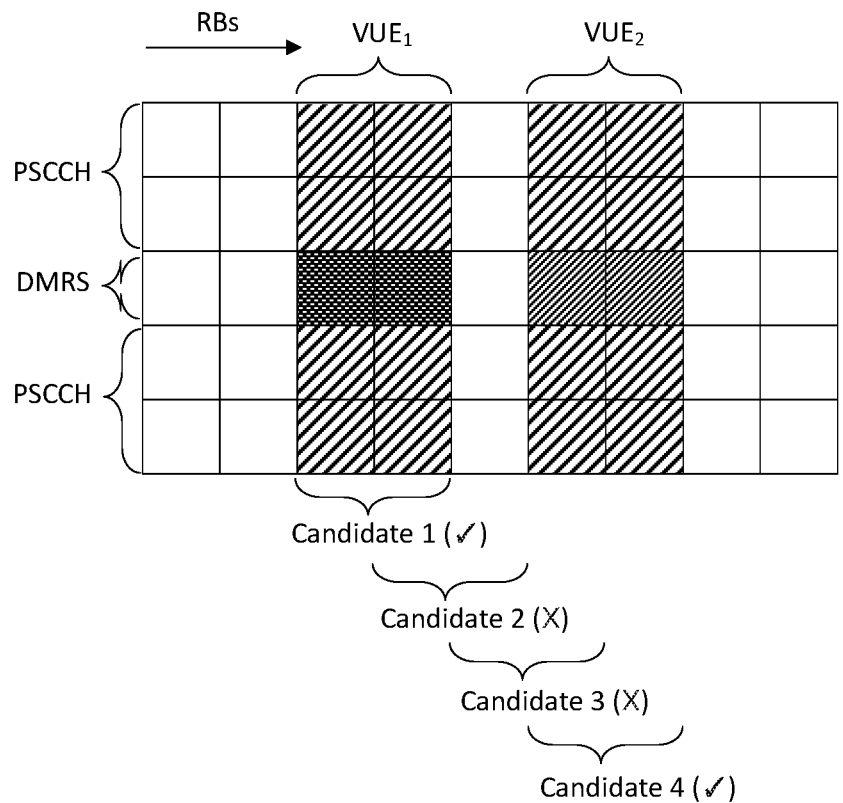
FIG. 3 is a diagram illustrating a PSCCH resource grid space with candidate RB pairs.

FIG. 3 shows the RB resource grid for VUE$_R$ 215 identifying the channel signals (PSCCH RBs) received at VUE$_R$ 215 from VUE$_1$ 220 and VUE$_2$ 225.

Figure 4:
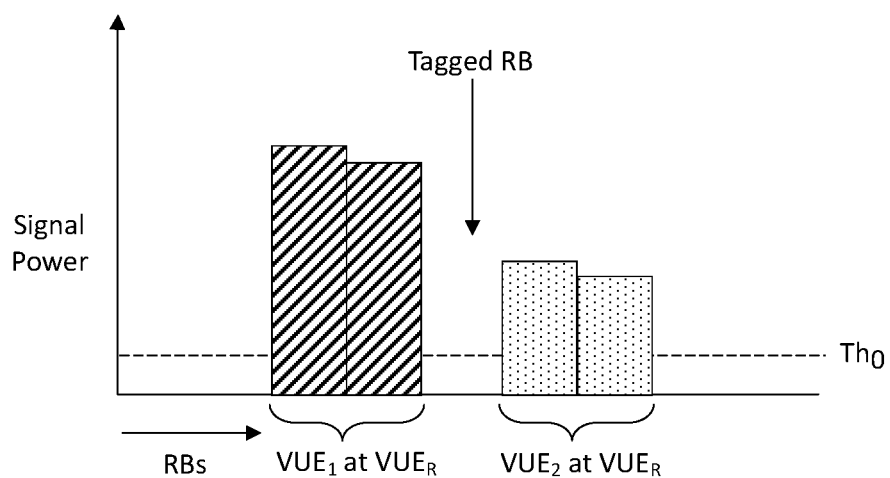
FIG. 4 is a diagram illustrating a first method of PSCCH resource grid space reduction in accordance with the present invention.
Figure 8:
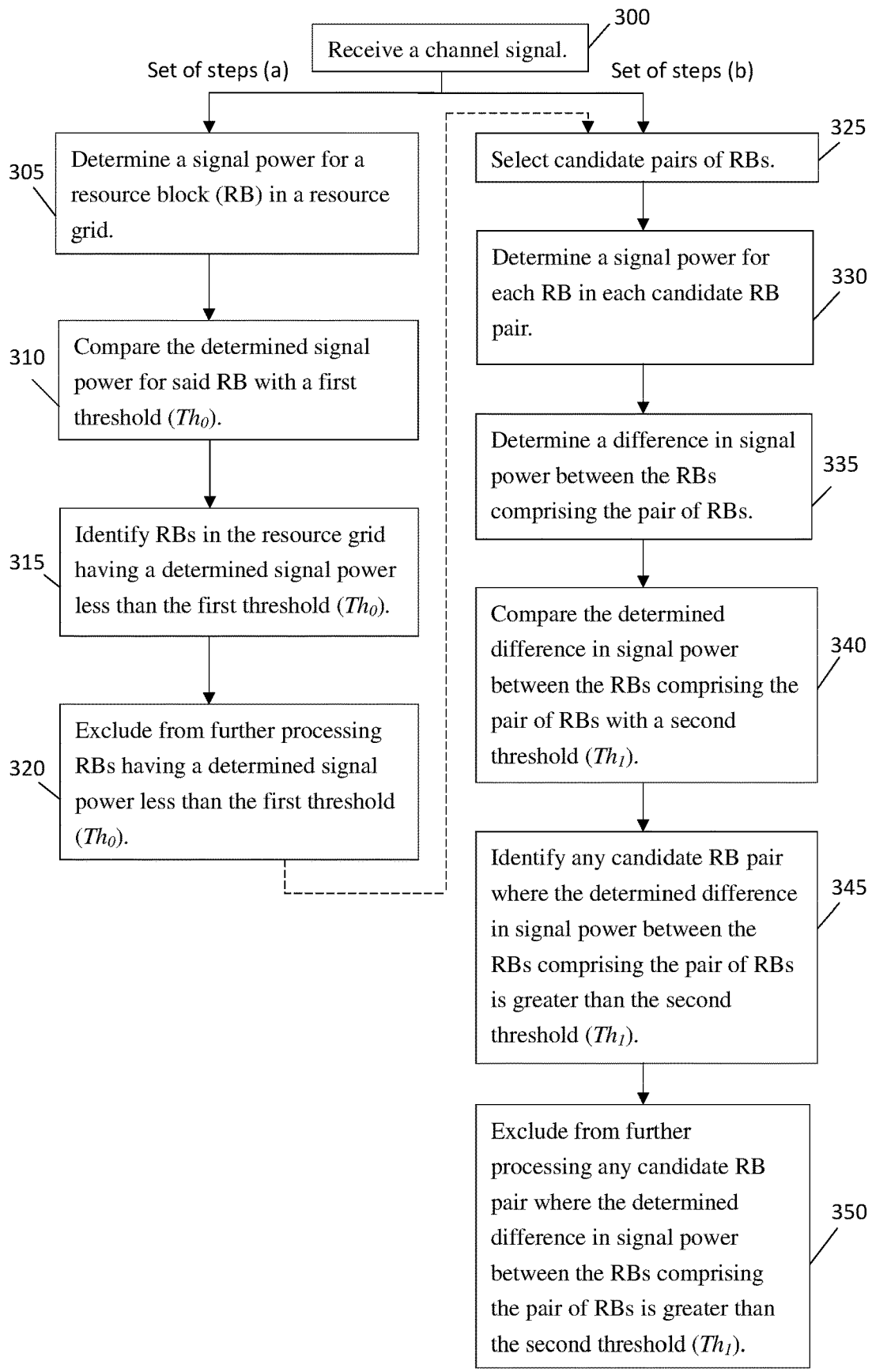
FIG. 8 is a flow diagram illustrating the first and second methods of PSCCH resource grid space reduction in accordance with the present invention.

In a first method of PSCCH resource grid space reduction in accordance with the invention as illustrated by the set of steps (a) of FIG. 8, the method comprises a first common step 300 of receiving at the channel signal processing device 100 one of more channel signals such as PSCCHs. As illustrated in FIG. 3, the received PSCCHs occupy pairs of RBs within the resource grid. In this example, some of the RBs in the resource grid are not utilized. The first PSCCH space reduction method includes a next step 305 of using the signal receiver module 110 and/or signal detection module 130 to determine a signal power for each RB in the resource grid. A next step 310, as illustrated in FIG. 4, involves comparing the determined signal power for each RB with a selected, calculated or predetermined first threshold (Th$_0$). Then, in step 315, RBs in the resource grid having a determined signal power less than the first threshold (Th$_0$) are identified and/or tagged such that said RBs can, at step 320, be identified for exclusion from further processing in the methods of the invention. The first threshold (Th$_0$) is selected, calculated or predetermined by offline theoretical analysis, simulation analysis, on-site field tests and/or on-line adaptation. The first PSCCH space reduction method provides a computationally efficient way of significantly reducing the PSCCH search space.

Preferably, the signal power determined by the signal receiver module 110 and/or signal detection module 130 for the RBs is determined at each RB's DMRS and preferably further is determined at orthogonal frequency division multiplexing (OFDM) symbols of said RB's DMRS. Furthermore, it is preferred that the signal power is determined only for RBs having a DMRS.

In a second method of PSCCH resource grid space reduction in accordance with the invention as illustrated by the set of steps (b) of FIG. 8, the method is based on selected candidate pairs of RBs. The second PSCCH space reduction method may be implemented alternatively to (as illustrated by FIG. 5) or in addition to (as illustrated by FIG. 6) the first PSCCH space reduction method.

Figure 5:
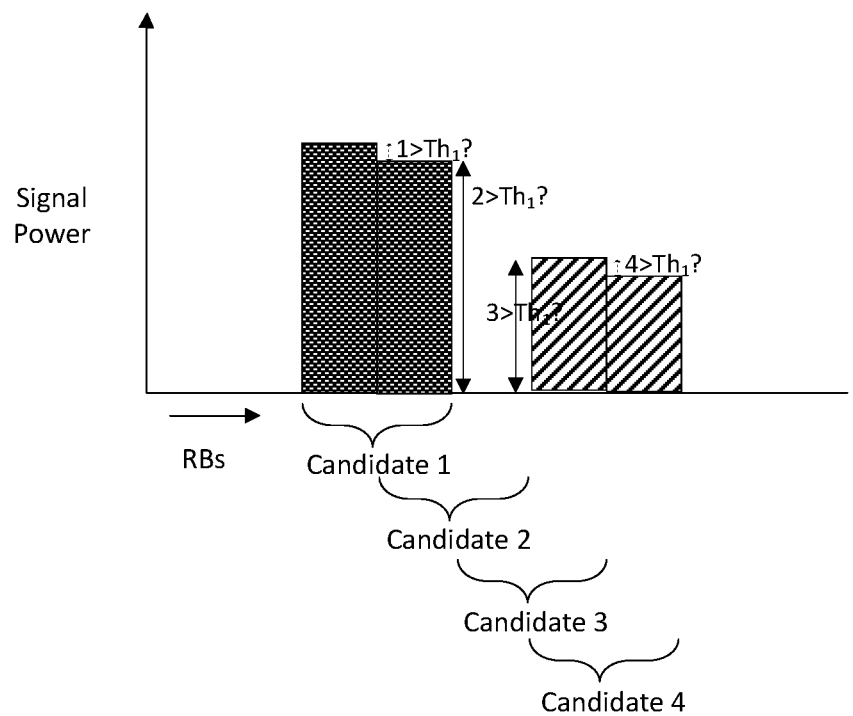
FIG. 5 is a diagram illustrating a second method of PSCCH resource grid space reduction in accordance with the present invention.

In the case illustrated by FIG. 5, there are shown four possible consecutive candidate pairs of RBs denoted as "candidate 1", "candidate 2", etc. Following the first common step 300, the first embodiment of the second PSCCH space reduction method requires, at step 325, selection of the candidate pairs of RBs. In this embodiment of the method, none of the RBs have been tagged for exclusion of further processing, i.e. the first PSCCH space reduction method as hereinbefore described has not been utilized in this case. In a next step 330, the signal receiver module 110 and/or signal detection module 130 determines a signal power for each RB in each candidate RB pair in the resource grid. Then, at step 335, a determination is made of a difference in signal power between the RBs comprising the pair of RBs. The determined differences in signal power for RBs in the candidate RB pairs is compared at step 340 to a selected, calculated or predetermined second threshold (Th$_1$). For example, a determination is made for "candidate 1" RB pair in FIG. 5 to see if the signal power difference denoted as "1" is greater than the second threshold (Th$_1$), i.e. 1>Th$_1$. For "candidate 1" RB pair, it is determined that the signal power difference between the two RBs forming said candidate pair is less than Th$_1$. Consequently, "candidate 1" RB pair is retained for further processing as is "candidate 4" RB pair, but "candidate 2" RB pair and "candidate 3" RB pair are excluded from further processing. The power signal difference comparison step 340 enables an identification at step 345 of any RB pairs where the determined difference in signal power between the RBs comprising the pair of RBs is greater than the second threshold (Th$_1$). This then leads to step 350 where any such candidate RB pairs are identified for exclusion from further processing in the methods of the invention. The second threshold (Th$_1$) is selected, calculated or predetermined by offline theoretical analysis, simulation analysis, on-site field tests and/or on-line adaptation.

Figure 6:
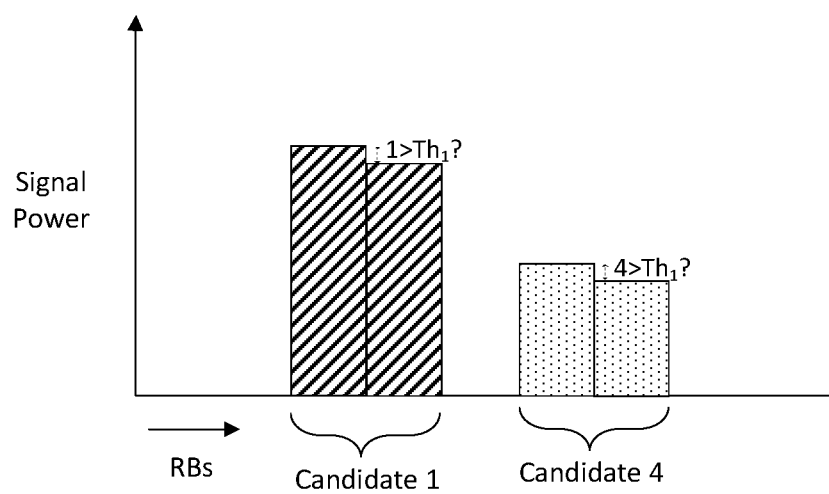
FIG. 6 is a diagram illustrating the second method of PSCCH resource grid space reduction when combined with the first method of PSCCH resource grid space reduction.

In the second embodiment of the second PSCCH space reduction method as shown in FIG. 6, the second PSCCH space reduction method (set of steps (b)) is implemented after the implementation of the first PSCCH space reduction method (set of steps (a)). This has the benefit of modifying the selection of candidate RB pairs step 325 in that, as a consequence of the first PSCCH space reduction method, some RBs have already been excluded from further processing and therefore cannot be included in the selection of candidate RB pairs for the second PSCCH space reduction method. Therefore, as shown by FIG. 6, "candidate 2" RB pair and "candidate 3" RB pair (of FIG. 5) are not considered in the second embodiment of the second PSCCH space reduction method, but "candidate 1" RB pair and "candidate 4" RB pair are selected.

Preferably, the RB candidate pairs are selected as consecutive pairs of RBs from any valid RBs, i.e. RBs that that not been excluded from further processing.

It will be noted that the first PSCCH space reduction method seeks to exclude RBs having a very low signal power at the receiver module 110 (VUE$_R$) whereas the second PSCCH space reduction method seeks to exclude RB pairs where there is a large difference in signal power between the RBs comprising said pair.

Figure 7:
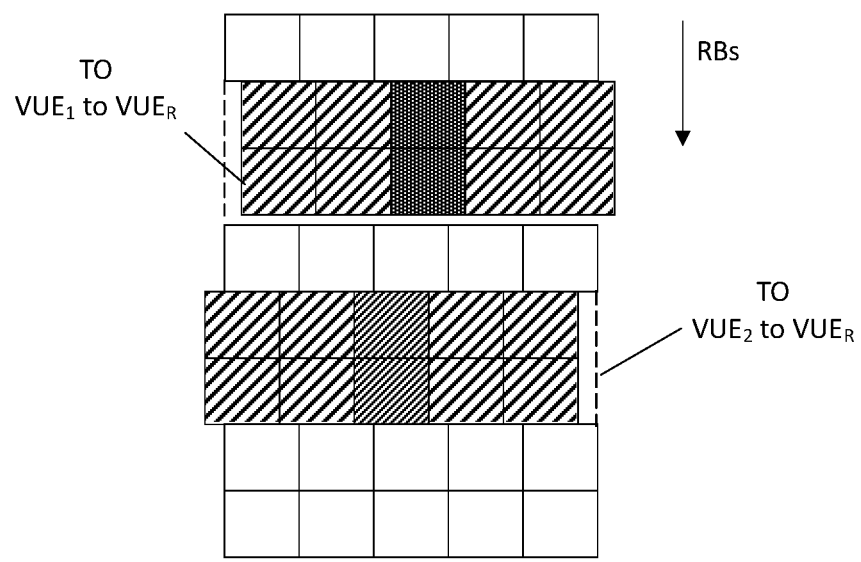
FIG. 7 is a diagram illustrating TOs between different VUEs leading to DMRS orthogonality violations.

Referring to FIG. 7 with reference to FIG. 2, a timing offset (TO) issue is illustrated whereby, due to such things as non-ideal GNSS and/or fading channels, a TO can arise at a receiver VUE. In the example network environment of FIG. 2, it is seen in FIG. 7 that there is a unique TO at VUE$_R$ with respect to VUE$_1$ and a further unique TO at VUE$_R$ with respect to VUE$_2$. The TOs between the receiver and the transmitters violate the orthogonality of the DMRSs.

Figure 9:
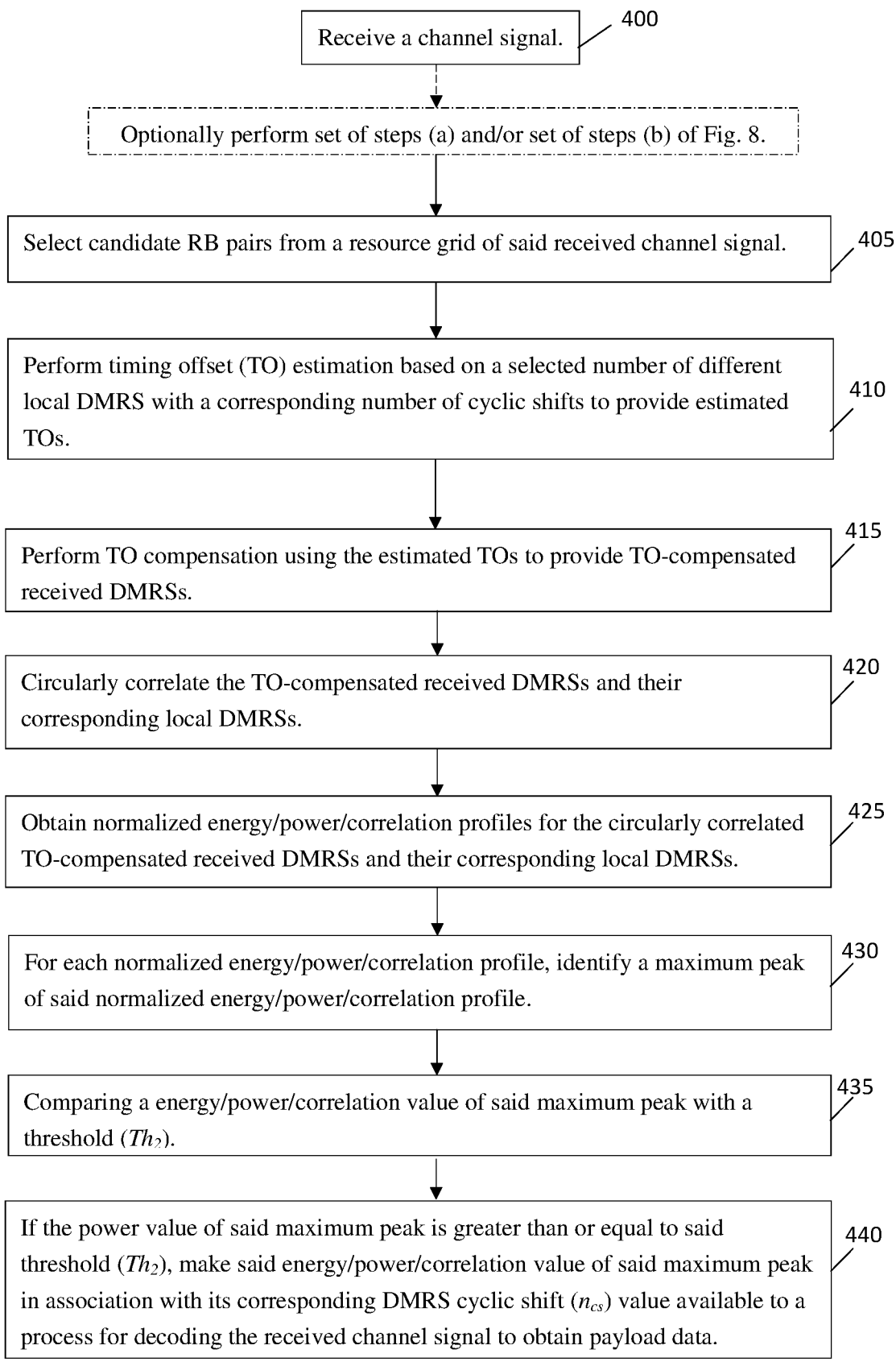
FIG. 9 is a flow diagram illustrating a first method of TO estimation and compensation in accordance with the present invention.
Figure 10:
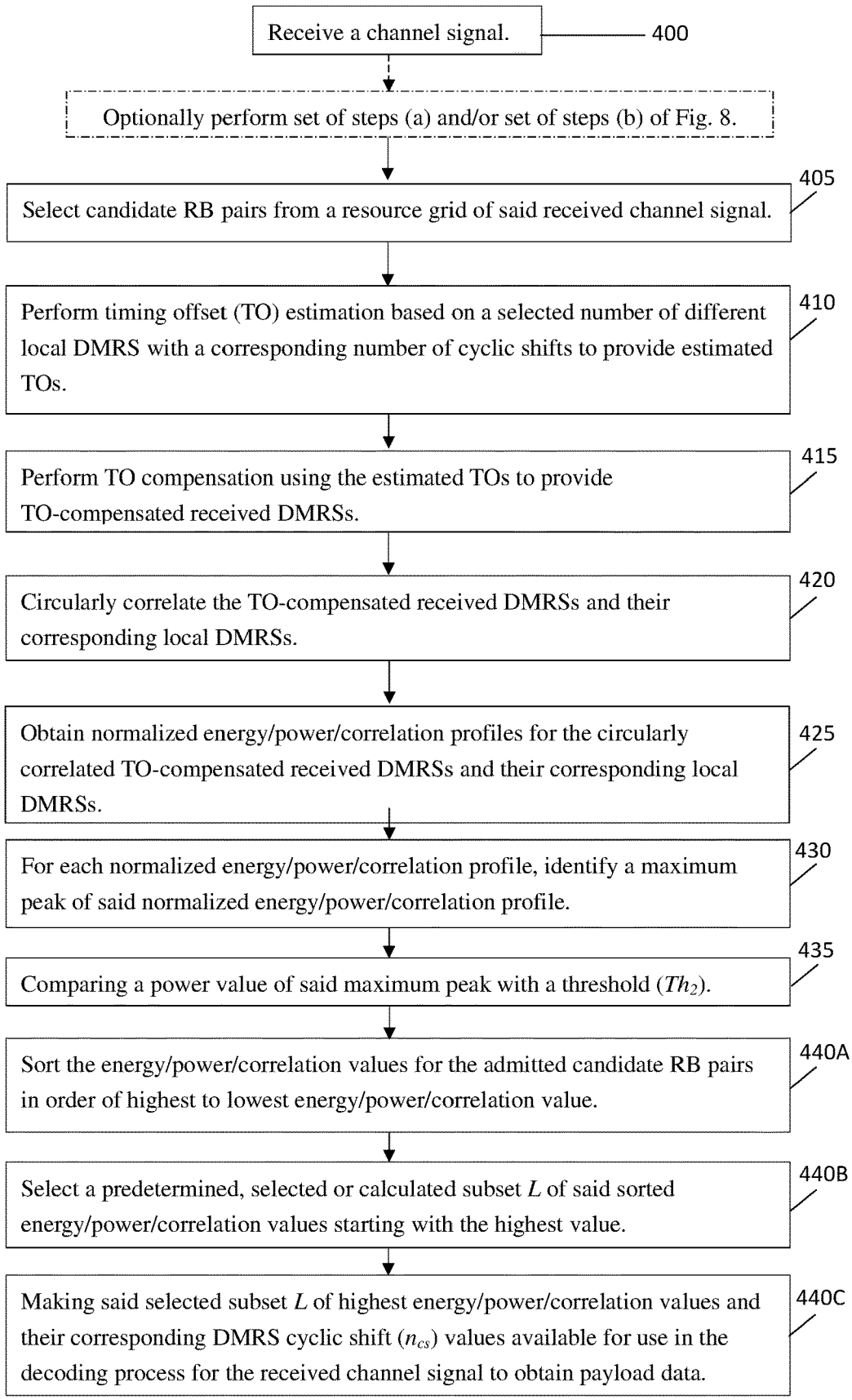
FIG. 10 is a flow diagram illustrating a second method of TO estimation and compensation in accordance with the present invention.

As shown in FIGS. 9 and 10, the present invention proposes a TO estimation and compensation method to address the issue illustrated by FIG. 7. It is strongly preferred that the TO estimation and compensation method hereinafter described is implemented after implementation of the first PSCCH space reduction method and/or the second PSCCH space reduction method such that the TO estimation and compensation is limited to admitted candidate RB pairs, where an admitted candidate RB pair comprises an RB pair where the determined difference in signal power between the RBs comprising said pair of RBs is less than or equal to the second threshold ($Th_1$). However, it is possible to implement the TO estimation and compensation method without first implementing the first PSCCH space reduction method and/or the second PSCCH space reduction method.

Having received a channel signal (PSCCH) at step 400 (FIG. 9), the signal detection module 130 is configured to select, at step 405, candidate RB pairs from the PSCCH resource grid of said received channel signal. For each selected (admitted) candidate pair, the signal detection module 130 is configured to perform, at step 410, timing offset (TO) estimation based on a selected number of different local DMRS ($l_0$, $l_3$, $l_6$, and $l_9$) with a corresponding number of cyclic shifts ($n_{cs}$=0, 3, 6, 9) to provide estimated TOs ($\widehat{to}_0$, $\widehat{to}_3$, $\widehat{to}_6$, and $\widehat{to}_9$) for the received PSCCHs. In the V2X environment, the selected number of different local DMRS ($l_0$, $l_3$, $l_6$, and $l_9$) comprises 4 with 4 corresponding cyclic shifts ($n_{cs}$=0, 3, 6, 9) to provide 4 estimated TOs ($\widehat{to}_0$, $\widehat{to}_3$, $\widehat{to}_6$ and $\widehat{to}_9$). The four estimated TOs ($\widehat{to}_0$, $\widehat{to}_3$, $\widehat{to}_6$, and $\widehat{to}_9$) are preferably determined from:

$$\widehat{to}_{ncs} = \frac{N_{FFT}}{2\pi} \frac{1}{K_s} \cdot L\left(\frac{1}{24-K_s} \cdot \sum_{i=0}^{23-K_s} [y(i)l^*_{ncs}(i)] \cdot [(y(i+K_s)l^*_{ncs}(i+K_s))]'\right)$$

where:
y is a received DMRS
$l_{ncs}$ is a local DMRS with cyclic shift $n_{cs}$
i is a sub-carrier index
$N_{FFT}$ is the FFT length
$(\cdot)^*$: is the complex conjugate and
$K_s$ is a configurable interval.

The interval $K_s$ is configurable such that the correct cyclic shift can be identified automatically after TO compensation and local DMRS correlation. For example, for the embodiment in LTE V2X release, the valid value of $K_s$ is between 4 to 12, inclusively.

In a next step 415, the signal detection module 130 is configured to perform TO compensation using the estimated TOs ($\widehat{to}_0$, $\widehat{to}_3$, $\widehat{to}_6$, and $\widehat{to}_9$) to provide TO-compensated received DMRSs ($\tilde{y}_0$, $\tilde{y}_3$, $\tilde{y}_6$, and $\tilde{y}_9$). Each of TO-compensated DMRS is preferably determined from:

$$\tilde{y}_{ncs}(i) = y_{ncs}(i) \cdot \exp(j \cdot 2\pi \cdot (i_0+i) \cdot \widehat{to}_{ncs} \cdot N_{FFT}^{-1})$$

where $\tilde{y}_{ncs}$ stands for the TO-compensated DMRS while $y_{ncs}$ stands for the received DMRS. $i_0$ is the starting index in the frequency domain of the current PSCCH.

In the ideal case where there is no noise, the received DMRS is only affected by TO, then the i-th element of the received time-shifted DMRS can be expressed as:

$$y_{ncs}(i) = l_{ncs_{org}}(i) * \exp\left(-j \cdot 2\pi \cdot \frac{TO}{N_{FFT}} i\right)$$

Substituting $y_{ncs}(i)$ into the TO-estimation equation gives:

$$\widehat{to}_{ncs} = \frac{N_{FFT}}{2\pi} \frac{1}{K_s} \cdot L\left(\frac{1}{24-K_s} \cdot \sum_{i=0}^{23-K_s} \left[l_{ncs_{org}}(i) * \exp\left(-j \cdot 2\pi \cdot \frac{TO}{N_{FFT}} i\right)l^*_{ncs}(i)\right] \cdot \left[l^*_{ncs_{org}}(i+K_s) * \exp\left(j \cdot 2\pi \cdot \frac{TO}{N_{FFT}}(i+K_s)\right)l_{ncs}(i+K_s)\right]\right)$$

Focusing on only the part inside the angle function and calling it φ equals to:

$$\varphi = \frac{1}{24-K_s} \cdot \sum_{i=0}^{23-K_s} [l_{ncs_{org}}(i)l^*_{ncs}(i)][l^*_{ncs_{org}}(i+K_s)l_{ncs}(i+K_s)]\left[\exp\left(-j \cdot 2\pi \cdot \frac{TO}{N_{FFT}} i\right) \cdot \exp\left(j \cdot 2\pi \cdot \frac{TO}{N_{FFT}}(i+K_s)\right)\right]$$

The third bracket at the right-hand side can be simplified and taken out of the summation as it is not related to summation index i:

$$\varphi = \frac{1}{24-K_s} \cdot \exp\left(j2\pi \cdot \frac{TO}{N_{FFT}} K_s\right) \Sigma_{i=0}^{23-K_s}[l_{ncs_{org}}(i)l^*_{ncs}(i)][l^*_{ncs_{org}}(i+K_s)l_{ncs}(i+K_s)]$$

The part inside the summation can be further simplified according to the orthogonal property:

$$\varphi = \frac{1}{24-K_s}\exp\left(j2\pi \cdot \left(\frac{TO}{N_{FFT}}K_s\right)\right) \cdot \begin{cases} \gamma & n_{cs} = n_{cs_{org}} \\ \gamma \cdot \exp\left(j2\pi \frac{n_{cs}-n_{cs_{org}}}{12} \cdot K_s\right) & n_{cs} \neq n_{cs_{org}} \end{cases}$$

where γ represents the amplitude part after the summation.

In the case of using correct $n_{cs}$, then the condition to make a correct TO estimation is that the angle function should not wrap-around. That means:

$$2\pi \cdot \frac{TO}{N_{FFT}} K_s \leq 2$$

In this case, the max value of $K_s$ is bounded by the maximum value of TO, which is given by the maximum length of cyclic shift in the LTE system, i.e., $TO_{max}$=168, which leads to the maximum value of Ks, as an integer, Ks,max=12 when NFFT=2048.

In the case of using the wrong $n_{cs}$, the condition to result in a wrong TO estimation, which will lead to a weak peak in the consequential energy/power/correlation profile in the next steps, is that the angle function wraps around. That means:

$$2\pi \cdot \frac{TO}{N_{FFT}} K_s + 2\pi \frac{n_{cs} - n_{cs_{org}}}{12} \cdot K_s \geq 2\pi$$

Comparing the TO caused phase accumulation, the phase accumulation caused by the wrong $n_{cs}$ choice is the dominant factor in the summation. So, we can loosen the condition to be:

$$2\pi \frac{n_{cs} - n_{cs_{org}}}{12} \cdot K_s \geq 2\pi$$

which leads to the lower bound of the $K_s$ to be 4 as follows:

$$K_{s,min} \geq \frac{12}{min(n_{cs} - n_{cs_{org}})} = 4$$

Then, in step 420, the signal detection module 130 is configured to circularly correlate the TO-compensated received DMRSs ($\tilde{y}_0, \tilde{y}_3, \tilde{y}_6$, and $\tilde{y}_9$) and their corresponding local DMRSs ($l_0, l_3, l_6$, and $l_9$) and obtain energy/power/correlation profiles of the circularly correlated TO-compensated received DMRSs $\tilde{y}_0, \tilde{y}_3, \tilde{y}_6$, and $\tilde{y}_9$) and their corresponding local DMRSs ($l_0, l_3, l_6$, and $l_9$). In a next step 425, the signal detection module 130 is configured to obtain normalized energy/power/correlation profiles ($z_0, z_3, z_6$, and $z_9$) of the energy/power/correlation profiles obtained for the circularly correlated TO-compensated received DMRSs ($\tilde{y}_0, \tilde{y}_3, \tilde{y}_6$, and $\tilde{y}_9$) and their corresponding local DMRSs ($l_0, l_3, l_6$, and $l_9$). The normalized energy/power/correlation profiles ($z_0, z_3, z_6$, and $z_9$) are obtained by (A): taking the magnitude squared of the energy/power/correlation profiles of the circularly correlated TO-compensated received DMRSs ($y_0, y_3, y_6$, and $y_9$) and their corresponding local DMRSs ($l_0, l_3, l_6$, and $l_9$) and then dividing by the average of the magnitude squared of the energy/power/correlation profiles. Using (A) is technically unexpectedly beneficial as any non-obvious peaks from the average value, whilst having high absolute energy by themselves, will be not ranked as high peaks after the normalization process.

For each normalized energy/power/correlation profile ($z_0, z_3, z_6$, and $z_9$), the signal detection module 130 is configured to identify, at step 430, a maximum peak of said normalized energy/power/correlation profile based on peak power level; to compare at step 435 a power value of said maximum peak with a third selected, calculated or predetermined threshold (Th$_2$); and to store or make available, at step 440, the power value of said maximum peak in association with a corresponding DMRS cyclic shift ($n_{cs}$) value, if the power value of said maximum peak is greater than or equal to said third threshold (Th$_2$), and preferably in association with a corresponding candidate pair index value. The foregoing steps are performed for each possible DMRS cyclic shift ($n_{cs}$) value for each RB candidate pair. The third threshold (Th$_2$) is selected, calculated or predetermined by offline theoretical analysis, simulation analysis, on-site field tests and/or on-line adaptation.

Preferably, the method further includes the steps 440A-C as shown in FIG. 10 comprising: sorting (step 440A) the stored energy/power/correlation values for the admitted candidate RB pairs in order of highest to lowest stored power value; selecting (step 440B) a predetermined, selected or calculated subset L of said stored energy/power/correlation values starting with the highest value; and making (step 440C) said selected subset L of highest stored energy/power/correlation values and their corresponding DMRS cyclic shift ($n_{cs}$) values available for use in a decoding process for the received channel signal. L is a target number of PSCCH candidates to pass to the channel signal processing device 100 for decoding PSCCH and PSSCH packet data units (PDUs). The target number should be no less than the required number of PSCCH/PSSCH to be conventionally decoded, nor greater than the affordable number of PSCCH/PSSCH to be decoded by the underlying computation capability of the channel signal processing device 100 (sidelink decoder).

The selected subset L of said stored energy/power/correlation values, their corresponding DMRS cyclic shift ($n_{cs}$) values and their corresponding candidate pair index values are used by the signal detection module 130 to decode a received PSSCH signal to obtain payload data. The selected subset L may be used in subsequent PSSCH/PSCCH decoding procedures.

The foregoing methods of the invention considerably reduce the computational workload of the signal detection module 130 as L<M, i.e. the computationally expensive channel estimation, de-modulation and convolutional coding procedures in a conventional channel signal decoder need only to be performed L times rather than up to X.M times (up to 4M times in a V2X environment). Simulation results indicate that a valid value of L may lie in the range of 10 to 20, which compares very favourably to a value of M=46 (10 MHz) or 96 (20 MHz). This saves on processing cost and simplifies the hardware design compared to conventional channel signal processing devices. The invention provides a PSCCH pre-screening scheme with low complexity and acceptable accuracy.

The foregoing methods and particularly those described with respect to FIGS. 9 and 10 are suitable for all devices needing to reduce or minimize processing overhead but are particularly suitable for low power devices. The methods described with respect to FIGS. 9 and 10 involve using a single DMRS in a subframe to detect PSCCHs for decoding. The single DMRS used may comprise the first received DMRS in the subframe. For higher power devices, however, it is possible to progressively pre-screen PSCCHs along multiple received DMRSs in the subframe in order to improve the PSCCH detection process. However, in order to reduce unnecessary processing and power consumption whilst still improving PSCCH detection efficiency and enable high detection accuracy, it is proposed to pre-screen PSCCHs along multiple received DMRSs until a suitable number of potential PSCCHs for decoding are identified or determined to enable a subset of validated potential PSCCHs to be selected. In this way, it has been found that it is possible to avoid processing all of said multiple received DMRSs whilst improving the PSCCH detection process.

The following description describes an enhanced method derived from the aspects of the invention already described herein with respect to FIGS. 1 to 10; the enhanced method being configured to progressively process two or more of multiple received DMRSs in a subframe thereby enabling more accurate PSCCH detection whilst still limiting the amount of processing of said multiple received DMRSs to maintain good latency. In other words, the enhanced method described below achieves a balance between enhanced accuracy of PSCCH detection without significantly increasing latency of PSCCH detection. The enhanced method uses largely the same processing steps for each of the multiple received DMRSs as are used in the methods described with respect to FIGS. 1 to 10 although any modifications are described below. The enhanced method can be implemented by the channel signal processing device of FIG. 1.

Figure 11:
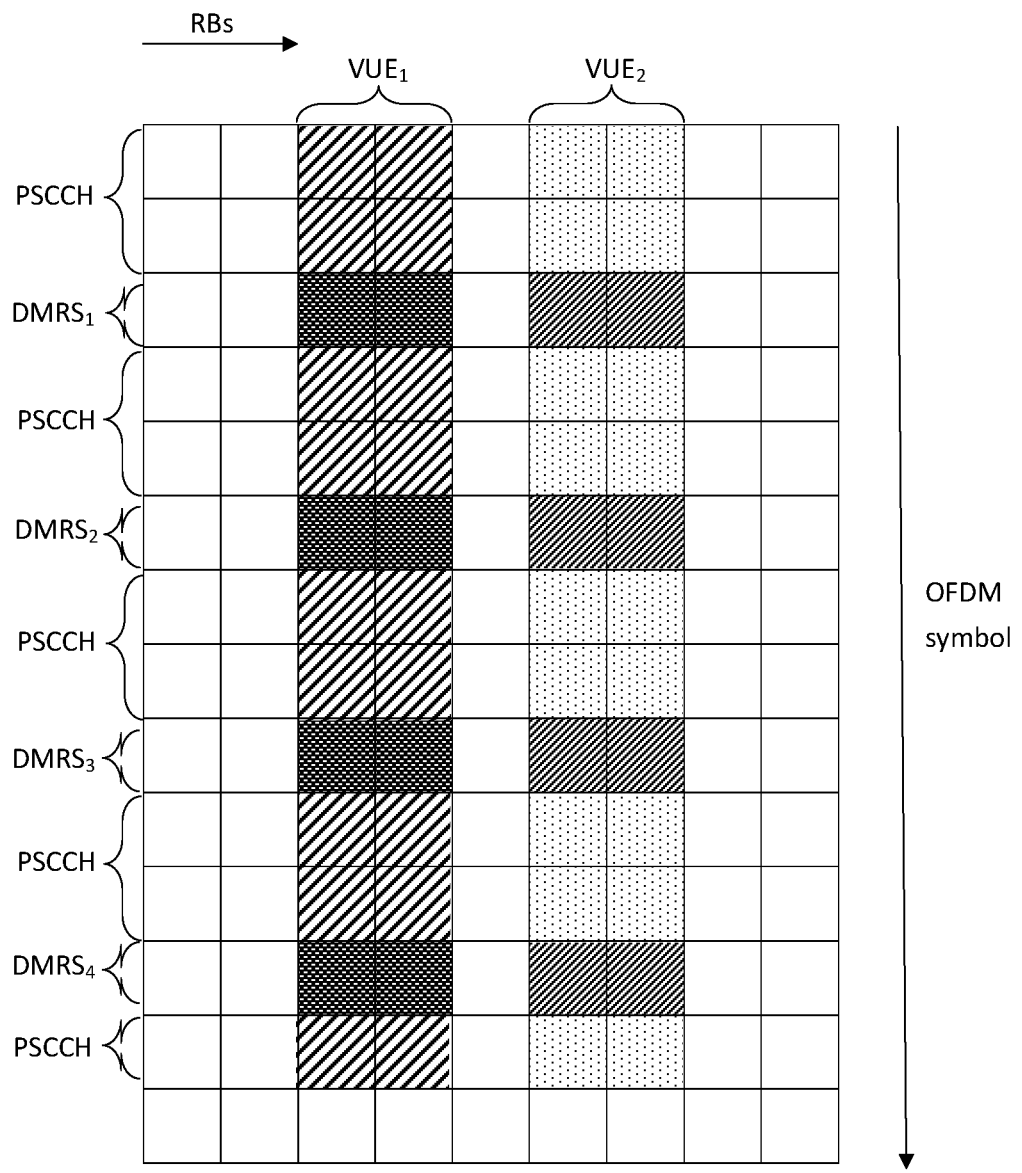
FIG. 11 is a diagram illustrating a PSCCH resource grid space with multiple received DMRSs.

FIG. 11 is a diagram illustrating a PSCCH resource grid space with multiple received DMRSs denoted respectively as $DMRS_1$ to $DMRS_4$ indicating that in this example the total number of DMRSs in a subframe=4. Furthermore, there are 4 possible cyclic shift ($n_{cs}$) values, i.e. $n_{cs}$=0, 3, 6 or 9. However, the enhanced method is not limited to 4 DMRSs in a subframe or the aforementioned cyclic shift ($n_{cs}$) values.

Figure 12:
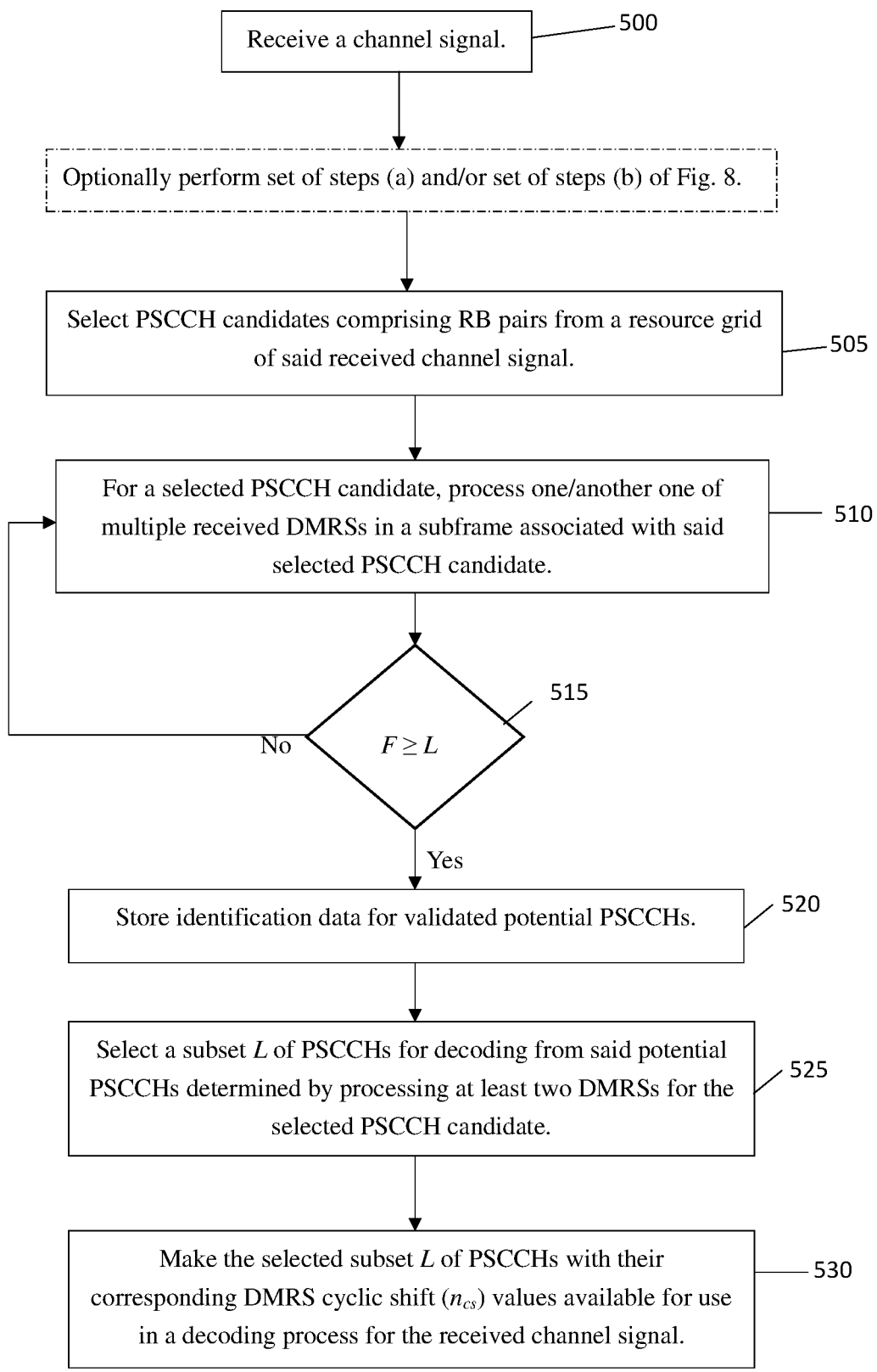
FIG. 12 is a flow diagram illustrating an enhanced method of TO estimation and compensation for multiple received DMRSs in accordance with the present invention.

Referring to FIG. 12, which comprises a flow diagram illustrating the enhanced method of processing the multiple received DMRSs in accordance with the present invention, it is preferred that processing the multiple received DMRSs is implemented after implementation of the first PSCCH space reduction method (set of steps (a) of FIG. 8) and/or the second PSCCH space reduction method (set of steps (b) of FIG. 8) such that processing the multiple received DMRSs is limited to PSCCH candidates where a selected PSCCH candidate comprises an RB pair with a determined difference in signal power between the RBs comprising said pair of RBs being less than or equal to the second threshold ($Th_1$). However, it is possible to implement the enhanced method of FIG. 12 without first implementing the first PSCCH space reduction method and/or the second PSCCH space reduction method of FIG. 8.

Having received a channel signal (PSCCH) at step 500 (FIG. 12), the signal detection module 130 is configured to select, at step 505, PSCCH candidates comprising RB pairs from the PSCCH resource grid of said received channel signal. For a selected PSCCH candidate, the signal detection module 130 is configured to process, at step 510, one of multiple received DMRSs in a subframe associated with said selected PSCCH candidate to determine one or more potential PSCCHs for decoding. The one of the multiple received DMRSs being processed is preferably a first one of the multiple received DMRSs in the associated subframe, e.g. $DMRS_1$. Each of the one or more potential PSCCHs determined from processing $DMRS_1$ is identified preferably by data comprising a resource block (RB) position in the resource grid and a corresponding DMRS cyclic shift ($n_{cs}$) value. The identification data may also include respective index numbers for the one or more potential PSCCHs.

Potential PSCCHs for decoding determined from processing some of the multiple received DMRSs are subjected to a validation process as will be described more fully below. However, it is preferred that a threshold ($Th_2$) referred to hereinbefore as 'the third threshold ($Th_2$)' for said validation process is determined, selected or calculated to have a value or level such that the number of potential PSCCHs for decoding determined from processing said first received DMRS, $DMRS_1$, is less than a required or desired number L such that, at decision box 515, the signal detection module 130 is required to repeat step 510 for at least one other of the multiple received DMRSs, e.g. at least one other of $DMRS_2$, $DMRS_3$, or $DMRS_4$. Consequently, the threshold ($Th_2$), which is preferably adjustable, is designed such that the enhanced method of FIG. 12 requires two or more of multiple received DMRSs to be processed. Preferably, other DMRSs that are processed in accordance with repeated step 510 are processed in their received order in the event that it becomes necessary to process more than one such other DMRS.

Taking by way of example the processing of the second DMRS, $DMRS_2$, in accordance with repeated step 510, identification data for one or more potential PSCCHs determined from the processing of $DMRS_2$ are stored at step 520 with the identification data for the one or more potential PSCCHs determined from the processing of $DMRS_1$. Preferably, a sufficient number of potential PSCCHs are determined from the processing of $DMRS_1$ followed by the processing of $DMRS_2$ such that it realizes a number F of validated potential PSCCHs which is greater than or equal to L. In the case where F≥L, it is not necessary to process any of the remaining multiple received DMRSs. In the case where F<L, it is necessary to repeat step 510 to process one or more remaining DMRSs until F is at least equal to L or until the last remaining DMRS is processed.

Numbers L and F may each be selected, calculated or predetermined by offline theoretical analysis, simulation analysis, on-site field tests and/or on-line adaptation.

At step 525, the signal detection module 130 selects a subset L of PSCCHs from said potential PSCCHs determined by processing at least $DMRS_1$ and $DMRS_2$. L is a target number of PSCCH candidates to pass to the channel signal processing device 100 for decoding PSCCH and PSSCH PDUs. The target number should be no less than the required number of PSCCH/PSSCH to be conventionally decoded, nor greater than the affordable number of PSCCH/PSSCH to be decoded by the underlying computation capability of the channel signal processing device 100 (sidelink decoder).

At step 530, the signal detection module 130 makes the selected subset L of PSCCHs with their corresponding DMRS cyclic shift ($n_{cs}$) values available for use in a decoding process for the received channel signal.

At step 520, the signal detection module 130 may be configured to select potential PSCCHs which share a common characteristic from the potential PSCCHs stored at step 515. This may comprise selecting for subset L potential PSCCHs having the same RB position in the resource grid and the same DMRS cyclic shift ($n_{cs}$) value.

The threshold ($Th_2$) is preferably adjustable on a per subframe basis. Furthermore, after the selection of the subset L of PSCCHs is concluded at step 525 or step 530, the method may include a step of adjusting the threshold ($Th_2$) for validating the potential PSCCHs dependent on the final number F of validated potential PSCCHs. For example, if the final number F of validated potential PSCCHs is equal to or greater than the number L of the subset of PSCCHs, then the method may include a step of increasing the threshold ($Th_2$) for subsequently validating potential PSCCHs. Conversely, if the final number F of validated potential PSCCHs is less than the number L of the subset of PSCCHs, then the method may include a step of decreasing the threshold ($Th_2$) for subsequently validating potential PSCCHs.

In the event where, after all DMRSs in said subframe are processed, the number F of validated potential PSCCHs remains less than the number L of the subset of PSCCHs then the subset L of PSCCHs may be made up to the number L by inclusion of not validated potential PSCCHs as will be more fully described below.

Figure 13:
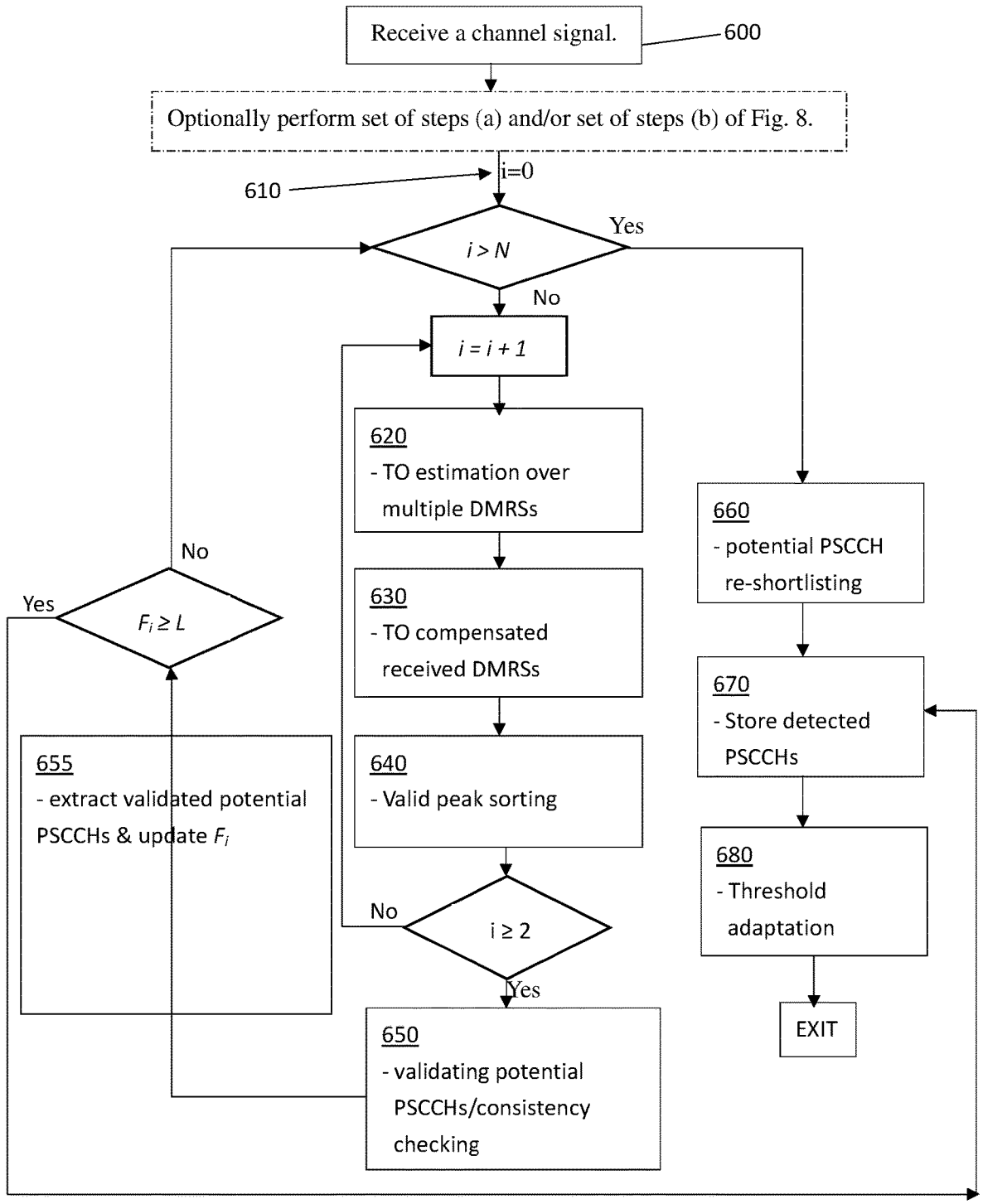
FIG. 13 is another flow diagram illustrating in greater detail the enhanced method of TO estimation and compensation for multiple received DMRSs in accordance with the present invention.

The enhanced method broadly illustrated by FIG. 12 is more specifically illustrated by FIG. 13. Referring to FIG. 13, the flow diagram illustrates the enhanced method in greater detail. A first step 600 of the method comprises the signal detection module 130 receiving a channel signal (PSCCH). However, as already described with respect to FIG. 12, the method 600 may include the signal detection module 130 firstly implementing the first PSCCH space reduction method (set of steps (a) of FIG. 8) and/or the second PSCCH space reduction method (set of steps (b) of FIG. 8), although this is not essential to the implementation of the method.

In a next step 610, the signal detection module 130 initializes a list of potential PSCCHs for decoding (or its RB equivalent) to be empty and to have a size denoted as $F_0$. Also, at step 610, the signal detection module 130 initializes an index of a received DMRS being processed as i=1, where the number of DMRSs in a subframe has a value N, e.g. for V2X N=4 DMRSs comprising $DMRS_1$ to $DMRS_4$.

At step 620, the signal detection module 130 performs timing offset (TO) estimation over multiple received DMRSs for each PSCCH candidate using each cyclic shift and using the first i-th received DMRS to provide estimated TOs. In the example of the network environment of FIG. 2, it is assumed that timing offset between the receiving $VUE_R$ and each transmitting VUE, e.g. $VUE_1$ and $VUE_2$, is relatively constant over a subframe. For a selected PSCCH candidate in the i-th DMRS, assuming k-th cyclic shift, TO estimation is performed for each PSCCH candidate using the first i received DMRS according to:

$$\widehat{to}_{i,k} = \frac{N_{FFT}}{2\pi K_s} \cdot L \left( \frac{1}{(P-K_s) \cdot i} \cdot \sum_{j=1}^{i} \sum_{p=0}^{P-K_s} (y_j(p) l_k^*(p)) \cdot (y_j(p+K_s) l_k^*(p+K_s))^* \right)$$

where:
$\{y_j\}$: is the j-th received DMRS
$\{l_k\}$: is a local DMRS with the k-th cyclic shift $n_{cs}$
$N_{FFT}$: is the FFT length
p: is the subcarrier index
$(\cdot)^*$: is the complex conjugate and
$K_s$ is a configurable interval.

The configurable parameter $K_s$ stands for the length of interval between two segments of correlation to obtain the phase/time difference. The interval $K_s$ is configurable such that the correct cyclic shift can be identified automatically after TO compensation and local DMRS correlation. For example, for the embodiment in LTE V2X release, the valid value of $K_s$ is between 4 to 12, inclusively.

At step 630, the signal detection module 130 performs TO compensation using the four estimated TO's with cyclic shift ($n_{cs}$) values=0, 3, 6, 9 respectively to provide TO-compensated received DMRSs. Also, at step 630, the signal detection module 130 is configured to circularly correlate the TO-compensated received DMRSs and their corresponding local DMRSs and to then obtain normalized energy/power/correlation profiles of the energy/power/correlation profiles obtained for the circularly correlated TO-compensated received DMRSs and their corresponding local DMRSs. The normalized energy/power/correlation profiles are obtained by taking the magnitude square of the correlation results and accumulating them over the first i-th DMRS, i.e. by taking the magnitude squared of the energy/power/correlation profiles of the circularly correlated TO-compensated received DMRSs and their corresponding local DMRSs and then dividing by the average of the magnitude squared of the energy/power/correlation profiles. The resulting real-value sequence for the i-th DMRS using the k-th $n_{cs}$ option at the resource grid potential PSCCH position q is denoted as $z_{i,k,q}$. Due to the random residual phase incurred by channel fading, the magnitude squared of the circular correlation results should be taken first before accumulating them over multiple DMRS to avoid destructive combinations.

At step 640, the signal detection module 130 performs valid peak sorting with diminishing sizes over multiple received DMRSs by obtaining the normalized energy/power/correlation profiles with their averages and identifying maximum peaks of said normalized energy/power/correlation profiles. Then the maximum peaks are validated with respect to the threshold ($Th_2$) and all valid peaks subsequently sorted. After traversing all candidates, the signal detection module 130 outputs $\phi_i$ comprising the largest peaks for shortlisting. $\phi_i$ is a function of total wanted candidates (potential PSCCHs) for decoding, i.e., L, and the accumulated chosen potential PSCCHs up to the previous symbol, i.e., $F_{i-1}$. If $\phi_i$ is smaller than the number of valid peaks then all valid potential PSCCHs are outputted. The outputted valid potential PSCCHs are stored as $C_i$.

More specifically, for processing the i-th DMRS in each subframe, the method normalizes each of the sequence $z_{i,k,q}$ with respect to its average. It then finds the peak (maximum) value for each normalized $z_{i,k,q}$ and denotes these as $s_{i,k,q}$.

For each potential PSCCH for decoding, the method records the DMRS cyclic shift hypothesis k* with the highest peak among the four that is also valid (i.e., the peak that is greater than the (configurable and/or adjustable) threshold ($Th_2$)). If there is any valid peak for a potential PSCCH then its position is stored and its corresponding DMRS cyclic shift ($n_{cs}$) value recorded.

After traversing all determined potential PSCCHs, the number of valid peaks is recorded as $M_i$. The valid peak values are sorted in the descending order and the highest $\phi_i$ potential PSCCHs are outputted as valid potential PSCCHs comprising the sorting result for the received multiple DMRS just processed. The output is a list of $\phi_i$ entries, each of which consists of the validated potential PSCCH index q, i.e. resource block position, the DMRS cyclic shift giving the highest correlation peak for this candidate k* and the peak value $s^*_{i,k,q}$.

Thus, $\phi_i = f(L, F_{i-2})$ where L is the total wanted candidates for decoding and $F_{i-1}$ is the number of shortlisted candidates up to the (i−1)-th DMRS. When $\phi_i > M_i$ then all valid potential PSCCHs are outputted.

The enhanced method of FIG. 13 provides a method of progressively processing a received channel signal in a device to device communications link using multiple reference symbols and further comprises the following steps.

At step 650, the signal detection module 130 performs validated potential PSCCH candidate shortlisting using consistency checking with two or more received multiple DMRS. Starting from the processing of the second received multiple DMRS, the signal detection module 130 searches for common candidates in $C_i$ and $C_{i-1}$, i.e., the candidates with the same RB position and the same DMRS cyclic shift value which are denoted as $D_i$. If the number of common candidates is less than $(L-F_{(i-1)})$ then all candidates in $D_i$ are shortlisted otherwise the candidates in $D_i$ with the $(L-F_{(i-1)})$ highest peaks are shortlisted. The list of validated potential PSCCHs ($F_i$) is updated at step 655 by accumulating the shortlisted validated potential PSCCHs for decoding. If $F_i$ is greater than or equal to L, the required validated potential PSCCHs for decoding are found and extracted for decoding and the shortlisting process terminated. The method can then move to steps 525 and 530 of FIG. 12 by way of concluding the process to detect potential PSCCHs for decoding without needing to process all received multiple DMRSs for a selected PSCCH candidate. In addition, the method may go to the optional step of adjusting the threshold ($Th_2$) for validating the potential PSCCHs dependent on the final number F of validated potential PSCCHs. However, if $F_i$ is less than L, then steps 620 to 650 are repeated until $F_i$ is greater than or equal to L or until all N received multiple DMRS have been processed.

More specifically, step 650 comprises starting from the processing of the i-th (i≥2) received multiple DMRS and then comparing the potential validated PSCCHs in $C_i$ with those in $C_{i-1}$ and obtaining therefrom a set of common validated potential PSCCHs $D_i$ i.e., the stored validated potential PSCCHs with both the same PSCCH candidate index i and cyclic shift value $k^*$. Then, if $|D_i| \leq (L-F_{i-1})$, set $R_i = D_i$ and shortlist all the validated potential PSCCHs in $R_i$ in the detected PSCCH list, otherwise set $R_i$ as the validated potential PSCCHs in $D_i$ with the $(L-F_{i-1})$ highest values of $s^*_{i,k,q}$. Update $C_i$ by removing $R_i$, and obtain the value of $F_i$ by accumulating the current number of shortlisted validated potential PSCCHs as: $F_i = F_{i-1} + |R_i|$. If $F_i$ is greater than or equal to L, the required number of validated potential PSCCHs to be shortlisted is found.

At step 660, the signal detection module 130 performs validated potential PSSCH re-shortlisting for the last DMRS. If $F_N < L$ after the consistency check in step 650 then the method involves shortlisting the rest of the potential PSCCHS in $C_N$ (with common validated potential PSCCHS already excluded) with the highest $(L-F_N)$ normalized peaks. The final L potential PSCCHs are selected for subsequent decoding procedures and the shortlisting process terminated. The method may then move to steps 525 and 530 of FIG. 12 by way of concluding the process to detect potential PSCCHs for decoding although in this instance it has been necessary to process all of the received multiple DMRS for an initial selected PSCCH candidate. In addition, the method may go to the optional step of adjusting the threshold ($Th_2$) for validating the potential PSCCHs dependent on the final number F of validated potential PSCCHs.

Step 670 comprises storing identification data for validated potential PSCCHs.

Step 680 comprises the optional step of adjusting the threshold ($Th_2$) for validating the potential PSCCHs dependent on the final number F of validated potential PSCCHs or threshold adaptation for pseudo peak elimination. This step involves adjusting the threshold ($Th_2$) for peak validation according to the number of final shortlisted candidates when the entire shortlisting process has terminated. The adaptation of the threshold is on a per-subframe basis such that:

If $F_N > L$, increase $Th_2$ to $\alpha.Th_2$ where $\alpha > 1$ is configurable;
If $F_N < L$, decrease $Th_2$ to $\beta.Th_2$ where $0 < \beta < 1$ is configurable.
Otherwise, $Th_2$ remains unchanged.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A method of processing a received channel signal, the method comprising:
    (a) for a physical sidelink control channel (PSCCH) candidate in a resource grid, processing a received demodulation reference signal (DMRS) in a subframe of said resource grid associated with said PSCCH candidate to determine one or more potential PSCCHs for decoding, each of said one or more potential PSCCHs being identified by resource block (RB) position in the resource grid and a corresponding DMRS cyclic shift ($n_{cs}$) value;
    (b) repeating step (a) for at least one other DMRS in said subframe to determine one or more potential PSCCHs for said at least one other DMRS;
    (c) selecting a subset L of PSCCHs from said potential PSCCHs determined by steps (a) and (b), where L is a number greater than zero and L<M where M comprises a number of possible RB candidate pairs in the resource grid; and
    (d) making said selected subset L of PSCCHs with their corresponding DMRS cyclic shift ($n_{cs}$) values available for use in a decoding process for the received channel signal.

2. The method of claim 1, further comprising a step of determining PSCCH candidates in the resource grid prior to implementation of steps (a) to (d).

3. The method of claim 1, wherein step (c) includes selecting from the potential PSCCHs determined by step (a)

and from the potential PSCCHs determined by step (b) any of said potential PSCCHs which share a common characteristic.

4. The method of claim 3, wherein the common characteristic comprises a same RB position in the resource grid and a same DMRS cyclic shift ($n_{cs}$) value.

5. The method of claim 1, wherein if, after performing steps (a) and (b), a number F of validated potential PSCCHs is equal to or greater than a number L of the subset of PSCCHs then step (b) is not repeated for another DMRS in said subframe.

6. The method of claim 1, wherein if, after performing steps (a) and (b), a number F of validated potential PSCCHs is less than a number L of the subset of PSCCHs then step (b) is repeated for another DMRS in said subframe.

7. The method of claim 6, wherein if, after all DMRSs in said subframe are processed, the number F of validated potential PSCCHs remains less than the number L of the subset of PSCCHs then the subset L of PSCCHs is made up to the number L by inclusion of not validated potential PSCCHs.

8. The method of claim 1, wherein, after the selection of the subset L of PSCCHs is concluded, adjusting a threshold for validating potential PSCCHs dependent on a final number F of validated potential PSCCHs.

9. The method of claim 8, wherein the step of adjusting the threshold for validating potential PSCCHs is performed on a per subframe basis.

10. The method of claim 8 wherein if, the final number F of validated potential PSCCHs is equal to or greater than a number L of the subset of PSCCHs, then the method includes a step of increasing the threshold for subsequently validating potential PSCCHs or, if the final number F of validated potential PSCCHs is less than the number L of the subset of PSCCHs, then the method includes a step of decreasing a threshold for subsequently validating potential PSCCHs.

11. The method of claim 1, wherein a PSSCH candidate comprises any RB pair in the resource grid which has a determined difference in signal power between the RBs comprising said pair of RBs at less than or equal to a predetermined, selected or calculated threshold ($Th_1$).

12. The method of claim 2, wherein the step of determining PSCCH candidates in the resource grid comprises performing one or both of the following sets of steps (a) and (b):
    (a) (i) determining a signal power for an RB in the resource grid;
    (ii) comparing the determined signal power for said RB with a selected, calculated or predetermined threshold ($Th_0$);
    (iii) identifying RBs in the resource grid having a determined signal power less than the threshold ($Th_0$) and excluding any such RBs from further processing;
    (b) (i) selecting candidate pairs of RBs in the resource grid;
    (ii) determining a signal power for each RB in each candidate RB pair in the resource grid;
    (iii) for each candidate RB pair in the resource grid, determining a difference in signal power between the RBs comprising the pair of RBs;
    (iv) comparing the determined difference in signal power between the RBs comprising the pair of RBs with a selected, calculated or predetermined threshold ($Th_1$);
    (v) identifying any candidate RB pair where the determined difference in signal power between the RBs comprising the pair of RBs is greater than the threshold ($Th_1$) and excluding any such candidate RB pair from further processing.

13. The method of claim 12, wherein the set of steps (a) is performed prior to the set of steps (b) such that the RBs determined as having a signal power less than the first threshold ($Th_0$) are excluded from the selection of candidate RB pairs for processing according to the set of steps (b).

14. A device for processing a received channel signal, the device comprising:
    a receiver configured to receive channel signals, wherein the channel signals include control channel data blocks of a control channel; and
    a signal detection module configured for detecting control channel blocks of the control channel, wherein the signal detection module includes machine readable instructions stored in a memory and executable by a processor to perform the steps of:
    (a) for a physical sidelink control channel (PSCCH) candidate in a resource grid, processing a received demodulation reference signal (DMRS) in a subframe of said resource grid associated with said PSCCH candidate to determine one or more potential PSCCHs for decoding, each of said one or more potential PSCCHs being identified by resource block (RB) position in the resource grid and a corresponding DMRS cyclic shift ($n_{cs}$) value;
    (b) repeating step (a) for at least one other DMRS in said subframe to determine one or more potential PSCCHs for said at least one other DMRS;
    (c) selecting a subset L of PSCCHs from said potential PSCCHs determined by steps (a) and (b), where L is a number greater than zero and L<M where M comprises a number of possible RB candidate pairs in the resource grid; and
    (d) making said selected subset L of PSCCHs with their corresponding cyclic shift ($n_{cs}$) values available for use in a decoding process for the received channel signal.

* * * * *